(12) United States Patent
Mukai et al.

(10) Patent No.: US 9,309,421 B2
(45) Date of Patent: Apr. 12, 2016

(54) INKJET RECORDING METHOD

(71) Applicant: SEIKO EPSON CORPORATION, Tokyo (JP)

(72) Inventors: Hiroshi Mukai, Shiojiri (JP); Katsuko Aoki, Kiso-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 13/938,685

(22) Filed: Jul. 10, 2013

(65) Prior Publication Data

US 2013/0293651 A1    Nov. 7, 2013

Related U.S. Application Data

(63) Continuation of application No. 11/963,298, filed on Dec. 21, 2007, now abandoned.

(30) Foreign Application Priority Data

Dec. 25, 2006 (JP) ................................. 2006-348089

(51) Int. Cl.
*B05D 3/02* (2006.01)
*C09D 11/30* (2014.01)

(52) U.S. Cl.
CPC ..................... *C09D 11/30* (2013.01)

(58) Field of Classification Search
CPC ........................................................ C09D 11/30
USPC ........................................................ 427/387
See application file for complete search history.

(56) References Cited

U.S. PATENT DOCUMENTS

| | | | |
|---|---|---|---|
| 5,981,623 A | 11/1999 | McCain et al. |
| 6,087,416 A | 7/2000 | Pearlstine et al. |
| 6,409,330 B1 | 6/2002 | Nakamura et al. |
| 6,524,383 B2 | 2/2003 | Komatsu et al. |
| 6,572,228 B2 | 6/2003 | Kaga et al. |
| 6,900,253 B2 | 5/2005 | Takao et al. |
| 7,731,789 B2 | 6/2010 | Aoki et al. |
| 8,500,264 B2 | 8/2013 | Mukai et al. |
| 2002/0154182 A1 | 10/2002 | Takahashi et al. |
| 2004/0024086 A1 | 2/2004 | Segawa et al. |
| 2004/0239738 A1 | 12/2004 | Watanabe |
| 2005/0176847 A1 | 8/2005 | Cagle |
| 2008/0028980 A1 | 2/2008 | Aoki et al. |

FOREIGN PATENT DOCUMENTS

| | | |
|---|---|---|
| EP | 0 974 626 A1 | 1/2000 |
| EP | 1 609 828 A1 | 12/2005 |
| JP | 621426 B2 | 1/1987 |
| JP | 03-056573 A | 3/1991 |
| JP | 03-079678 A | 4/1991 |
| JP | 03-160068 A | 7/1991 |
| JP | 04-018462 A | 1/1992 |
| JP | 10-279871 A | 10/1998 |
| JP | 2000-044858 A | 2/2000 |
| JP | 2002-038061 A | 2/2002 |
| JP | 2003-206426 A | 7/2003 |
| JP | 2003-306620 A | 10/2003 |
| JP | 2004-114691 A | 4/2004 |
| JP | 2004-176057 A | 6/2004 |
| JP | 2004-250659 A | 9/2004 |
| JP | 2005-048188 A | 2/2005 |
| JP | 2005-194301 A | 7/2005 |
| JP | 2005-220352 A | 8/2005 |
| JP | 2006022328 A | 1/2006 |
| JP | 2006-281533 A | 10/2006 |
| JP | 2006-281538 A | 10/2006 |
| JP | 2006-281568 A | 10/2006 |
| JP | 2006-281570 A | 10/2006 |
| JP | 2006-282810 A | 10/2006 |
| JP | 2006-282822 A | 10/2006 |
| JP | 2006-282823 A | 10/2006 |
| JP | 2007-154087 A | 6/2007 |
| WO | 0004103 A1 | 1/2000 |
| WO | 0162862 A1 | 8/2001 |

OTHER PUBLICATIONS

English machine translation of JP 2006-282822.*

* cited by examiner

*Primary Examiner* — Robert S Walters, Jr.
(74) *Attorney, Agent, or Firm* — Sughrue Mion, PLLC

(57) ABSTRACT

An inkjet recording method for printing by ejecting droplets of a water-based ink composition onto a recording medium having a recording surface which is a plastic film and by causing the droplets to adhere to the recording surface, including: using, as the water-based ink composition, a water-based ink composition including at least colorant, between 0.1 wt % and 1.5 wt % of a silicon-based surfactant, alkanediol, pyrrolidone derivative, thermoplastic resin, and water; and heating the water-based ink composition that has adhered to the recording surface to a temperature of 40° C. or higher.

6 Claims, No Drawings

INKJET RECORDING METHOD

CROSS-REFERENCE TO RELATED APPLICATIONS

This application is a continuation of U.S. application Ser. No. 11/963,298, filed Dec. 21, 2007, which claims priority to Japanese Patent Application No. 2006-348089, filed Dec. 25, 2006, each of which is incorporated herein by reference in its entirety.

BACKGROUND

1. Technical Field

The present invention relates to an inkjet recording method that has improved effects such as image quality when printing with a water-based ink particularly at a high duty of 50% or higher on a recording medium having a recording surface which is a plastic film (such as a so-called non-coated plastic media), and more specifically to an inkjet recording method that improves color bleeding and mottling variation of the ink on printed matter, and that improves drying properties.

2. Related Art

Conventionally various technologies have been proposed to improve the effects such as image quality of printed matter for a recording medium having a recording surface which is a plastic film.

JP-A-2004-114691 discloses an inkjet recording method of printing together with heating on an ink jet recording element using an inkjet ink composition that includes a water-based inkjet ink composition that contains a polymer latex or the like that contains at least one type of halogenated vinyl monomer, in order to provide an inkjet ink that has good adhesion to a nonabsorbent base material such as an untreated vinyl derivative and that has good water durability, light durability, and abrasion resistance.

Furthermore, JP-A-2004-176057 discloses a water-based inkjet ink composition suitable for printing on a hydrophobic surface, containing a water-based emulsion polymer with a glass transition temperature (Tg) between −40° C. and 150° C.; pigment; and a water soluble surfactant; in order to provide a water-based ink jet ink composition suitable for printing on a hydrophobic surface.

Further advantages to the adhesion and image quality when using these ink compositions typically occur if the surface is preheated prior to spraying the image droplets on the surface.

Furthermore, JP-A-2004-250659 discloses a method of printing ink that uses a thermosetting resin onto media.

Furthermore, JP-A-2006-22328 discloses a method of printing an image on a hydrophobic substrate comprising a) a step of spraying a water-based ink jet ink composition containing i) a water-based vehicle; ii) a self dispersing pigment; iii) a surfactant containing silicon; and iv) a polymer with a glass transition temperature (TG) between −40° C. and 150° C.; and b) a step of drying the water-based ink jet ink composition; further including a step of heating the surface and/or the image formed on the surface prior to the drying step.

However, the technologies disclosed in the aforementioned documents do not improve the printing image quality.

Furthermore, JP-A-10-279871 discloses a composition containing a 1,2-alkyldiol, a polyorganosiloxane wetting agent, and 2-pyrrolidone, in order to provide an ink composition and printing method thereof that provides high printing quality at high resolution and high speed while reducing spray of ink droplets in the wrong directions and reducing nozzle failure. However, this ink composition is not compatible with plastic media that does not have an ink absorbing layer.

SUMMARY

Therefore, an object of the present invention is to provide an inkjet recording method that improves color bleeding and mottling variation when printing with a water-based ink particularly at a high duty of 50% or higher on a recording medium having a recording surface which is a plastic film.

The inventors have achieved the aforementioned object by providing the following inventions.

1. An inkjet recording method for printing by ejecting droplets of a water-based ink composition onto a recording medium having a recording surface which is a plastic film and by causing the droplets to adhere to the recording surface, including:

using, as the water-based ink composition, a water-based ink composition including at least colorant, between 0.1 wt % and 1.5 wt % of a silicon-based surfactant, alkanediol, pyrrolidone derivative, thermoplastic resin, and water; and heating the water-based ink composition that has adhered to the recording surface to a temperature of 40° C. or higher.

2. The inkjet recording method according to 1 above, wherein the silicon-based surfactant is a polysiloxane based compound, the alkanediol is 1,2-hexanediol, and the pyrrolidone derivative is N-methylpyrrolidone.

3. The inkjet recording method according to 1 or 2 above, wherein the weight ratio between the amount of silicon-based surfactant and the amount of alkanediol in the water-based ink composition (former:latter) is between 1:150 and 3:8.

4. The inkjet recording method according to any one of 1 through 3 above, wherein the weight ratio between the amount of alkanediol and the amount of thermoplastic resin in the water-based ink composition (former:latter) is between 4:3 and 5:2.

5. The inkjet recording method according to any one of 1 through 4 above, wherein the amount of pyrrolidone derivative added to the water-based ink composition is between 4.0 wt % and 25.0 wt %.

6. The inkjet recording method according to any one of 1 through 5 above, wherein the colorant is a pigment, and the pigment is dispersed in the water-based ink composition.

7. The inkjet recording method according to any one of 1 through 6 above, wherein the water-based ink composition also includes a low surface tension organic solvent.

8. The inkjet recording method according to 7 above, wherein the low surface tension organic solvent is diethylene glycol monobutyl ether or triethylene glycol monobutyl ether.

9. The inkjet recording method according to any one of 1 through 8 above, wherein the water-based ink composition also includes a wetting agent.

10. The inkjet recording method according to any one of 1 through 9 above, wherein heating is performed by heating with a heater or by drying with warm air.

11. A recorded matter, wherein an image is formed using the inkjet recording method according to any one of 1 through 10 above.

DESCRIPTION OF EXEMPLARY EMBODIMENTS

The present invention can provide an inkjet recording method that improves color bleeding and mottling variation when printing with a water-based ink particularly at a high duty of 50% or higher on a recording medium having a recording surface which is a plastic film. Furthermore, recorded matter with high image quality and excellent abrasion resistance can be obtained by this recording method.

The inkjet recording method according to the invention will be described below based on exemplary embodiments.

According to an aspect of the present invention, the inkjet recording method is a recording method for printing by ejecting droplets of a water-based ink composition onto a recording medium having a recording surface which is a plastic film, and by causing the droplets to adhere to the recording surface, including:

using, as the water-based ink composition, a water-based ink composition including at least colorant, between 0.1 wt % and 1.5 wt % of a silicon-based surfactant, alkanediol, pyrrolidone derivative, thermoplastic resin, and water; and heating the water-based ink composition that has adhered to the recording surface to a temperature of 40° C. or higher.

The invention can achieve the aforementioned effects by having this composition. In other words, printing that controls ink mottling and color bleeding when printing with a water-based ink particularly at a high duty of 50% or higher on a recording medium having a recording surface which is a plastic film is made possible. Therefore, recorded matter with high image quality and excellent abrasion resistance such as plastic media printed matter or the like can be achieved with brilliant colors.

Inkjet Printing Method

As described above, the inkjet recording method of the invention performs printing by ejecting droplets of a water-based ink composition on a recording medium having a recording surface which is a plastic film, and causing to adhere to the recording surface. At this time, printing at a high duty of 50% or more is preferable because of the excellent effects.

Furthermore, as described above, another aspect of the recording method of the invention heats the water-based ink composition that has adhered to the recording surface to a temperature of 40° C. or higher. By heating, the water component in the water-based ink composition on the printed recording medium will evaporate, thus promoting drying of the water-based ink composition and forming a film (resin film) of the thermoplastic resin that is in the water-based ink composition.

The heating temperature is preferably between 40 and 60° C. If the heating temperature exceeds 60° C., softening or deformation may occur depending on the type of plastic film that is used on the recording surface of the recording medium, so transport of the recording medium may be difficult, and shrinking may occur after heating. Therefore, the upper limit of the heating temperature during printing is preferably 60° C.

In the process of this operation, solvents including water that are included in the water-based ink composition can evaporate, so it is thought that the adhesion between the plastic and the resin film that is formed can be stronger. The heating means can be any commonly used heating means and can be performed by normal methods using a commonly known heating device like an infrared heating device or a hot air heating device. The heating process of the invention can preferably be performed by heating with a heater or drying with warm air. Furthermore, any heating conditions other than the heating temperature are acceptable so long as the resin in the water-based ink composition can form a resin film by heating, and the conditions can be appropriately set while considering the type of resin particles. For example, when heating with a heater or drying with warm air, the heating time can be between 1 minute and 1 day, preferably between 3 minutes and 18 hours.

Furthermore, a method of transporting a preheated recording medium to a printer, and printing the water-based ink composition on this recording medium, or a method of installing a heater in the section (platen) of the printer that supports the recording medium in the printing part of the printer, and printing while heating the water-based ink composition on the recording medium, or a combination of these methods can also be used.

A recording medium having a recording surface which is a plastic film includes plastic films with a surface that has not been treated for inkjet printing (for instance, without an ink absorption layer), as well as media where the recording media itself is a plastic film, media where a commonly used recording medium such as paper is coated with plastic, and media where a plastic film has been bonded to a substrate, and the like. Furthermore, plastic herein is not particularly restricted, and for example can include vinyl chloride, polyethylene terephthalate (PET), polycarbonate, polystyrene, and polyurethane and the like.

Water-Based Ink Composition

As described above, the water-based ink composition that is used in the recording method of the invention contains at least a colorant, between 0.1 wt % and 1.5 wt % of a silicon-based surfactant, an alkanediol, a pyrrolidone derivative, a thermoplastic resin, and water.

With the water-based ink composition that is used with the invention, the amount of components that dissolve the plastic film are adjusted depending on the drying conditions of the ink as well as the type of substrate and the condition of at least the plastic film of the recording medium that is used as the recording surface, and therefore the amount of ink applied can be appropriately adjusted to achieve image reproducibility.

The thermoplastic resin is normally a resin that disperses in a water-based ink composition. In other words, the water-based ink composition preferably contains specific amounts of the silicon-based surfactant, alkanediol, pyrrolidone derivative, as well as a dispersing medium that includes at least water which is the main solvent, and a thermoplastic resin (or thermoplastic resin dispersed with pigment if the thermoplastic resin also functions as a pigment dispersing agent) that is dispersed in this dispersing medium. The colorant in the water-based ink composition is preferably a pigment, and this pigment is dispersed in the water-based ink composition. Preferably, the water-based ink composition also includes a low surface tension organic solvent. In addition, the water-based ink composition can also contain a wetting agent.

Silicon-Based Surfactant

The present invention contains between 0.1 wt % and 1.5 wt % of a silicon-based surfactant based on the total amount of ink composition in order to control mottling variation and bleeding in the ink as well as to uniformly spread the ink on the recording medium after printing.

The silicon-based surfactant is preferably a polysiloxane compound, and examples include polyether modified organosiloxane and the like.

Polyether modified organosiloxanes are compounds shown by the following Formula (I) and the like.

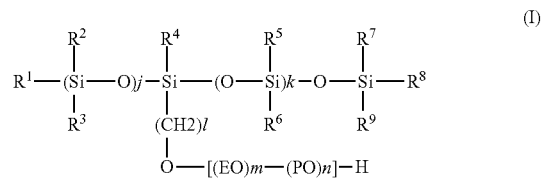

(wherein $R_1$ through $R_9$ independently represent C1-6 alkyl groups, j and k independently represent integers 1 or higher, EO represents an ethyleneoxy group, PO represents a propyleneoxy group, m and n represent integers 0 or higher but m+n is an integer that is 1 or higher, and EO and PO may be in any order inside the brackets [ ], or may be random, or blocked.)

In particular, j+k is preferably between 11 and 300, more preferably between the 11 and 100, and particularly preferably between 11 and 50, from the viewpoint of preventing mottling variation that occurs when the ink is repelled on the recording medium after printing.

The compound of Formula (I) is commercially available, and these products can be used. Examples of products that can be used include the silicon-based surfactants BYK-306, BYK-307, BYK-333, BYK-341, BYK-345, BYK-346, BYK-348 from BYK-Chemie Japan.

The amount of silicon-based surfactant added is between 0.1 wt % and 1.5 wt % as described above, in order to achieve the effect of the invention.

Alkanediol

The alkanediol is used in the invention in order to provide the effect of controlling mottling variation and bleeding of the ink and to uniformly spread the ink on the printed recording medium.

Specific examples of the alkanediol include 1,2-hexanediol, 1,3-hexanediol, 1,2-heptanediol, 1,3-heptanediol, 1,2-octanediol, 1,3-octanediol, 1,2-pentanediol and the like, but of these compounds, 1,2-hexanediol is preferable from the viewpoint of water solubility and the effect of controlling bleeding.

The amount of alkanediol added is between 1.0 and 15.0 wt %, and preferably between 4.0 and 10.0 wt %, based on the total amount of ink composition.

The weight ratio of the aforementioned silicon-based surfactant to the alkanediol (former:latter) is preferably between 1:150 and 3:8, from the viewpoint of controlling mottling variation and color bleeding in the ink.

Pyrrolidone Derivative

A pyrrolidone derivative is added to the water-based ink composition while taking into account the balance between the spreading of the ink on the printed recording medium due to the silicon-based surfactant and the alkanediol, and the hardening of a thermosetting resin that will be described later.

Specific examples of the pyrrolidone derivatives include N-methylpyrrolidone, N-ethylpyrrolidone, N-vinylpyrrolidone, and 2-pyrrolidone, and the like, but of these, N-methylpyrrolidone is preferable from the viewpoint of rapid drying and promoting the formation of the thermoplastic resin film.

The amount of pyrrolidone derivative added is preferably between 2.0 wt % and 25.0 wt %, more preferably between 4.0 and 25.0 wt %, based on the total amount of ink composition.

Thermoplastic Resin

The water-based ink composition includes a thermoplastic resin in order to harden the ink containing a low volatile alkanediol and a silicon-based surfactant. The thermoplastic resin is normally a resin that disperses in the water-based ink composition. The thermoplastic resin can be a resin that is soluble or a resin that is insoluble in the vehicle of the water-based ink composition. Resins that are soluble in the vehicle of the water-based ink composition are preferably resin dispersing agents used to disperse the aforementioned pigment. Furthermore, resins that are insoluble in the vehicle of the water-based ink composition are preferably added to the water-based ink composition in the form of a resin emulsion of resin particles. Herein, the resin emulsion has a resin component (thermoplastic resin component) that is the discontinuous phase in water which is the continuous phase.

In the exemplary embodiment of the invention, the thermoplastic resin is preferably a polymer that has both a hydrophilic part and a hydrophobic part. If a resin emulsion is used as the thermoplastic resin, the particle diameter that forms the emulsion is not particularly restricted, but is preferably around 150 nm or less, and more preferably between approximately 5 and 100 nm.

The thermoplastic resin can be the same resin component as the dispersing agent resins or resin emulsions which have conventionally been used in ink compositions for inkjet printing. Specific examples of these thermoplastic resins include acrylic polymers such as polyacrylate esters and copolymers thereof, polymethacrylate esters and copolymers thereof, polyacrylonitrile and copolymers thereof, polycyanoacrylate, polyacrylamide, polyacrylic acid, and polymethacrylic acid; polyolefin polymers such as polyethylene, polypropylene, polybutene, polyisobutylene, polystyrene, and copolymers thereof, petroleum resin, coumarone indene resin, and terpene resin; vinyl acetate and vinyl alcohol polymers such as polyvinyl acetate and copolymers thereof, polyvinyl alcohol, polyvinyl acetal, and polyvinylether; halogen containing polymers such as polyvinyl chloride and copolymers thereof, polyvinylidene chloride, fluoride resins and fluoride rubbers; nitrogen containing vinyl polymers such as polyvinyl carbazole, polyvinyl pyrrolidone, and copolymers thereof, polyvinyl pyridine, and polyvinyl imidazole; diene polymers such as polybutadiene and copolymers thereof, polychloroprene, and polyisoprene (butyl rubber); as well as other ring opening polymerization compounds, condensation polymerization resins, and natural polymer resins and the like.

In order to obtain the thermoplastic resin as an emulsion, in some cases the resin particles can be prepared by blending in water together with a surfactant. For example, an emulsion of an acrylic resin or a styrene-acrylic acid copolymer can be obtained by blending a (meth)acrylate ester resin or a styrene-(meth)acrylate ester resin and in some cases a (meth)acrylic acid resin in water together with a surfactant. Normally the blending ratio of the resin component and the surfactant is preferably between approximately 50:1 and 5:1. If the amount of surfactant used is below the aforementioned range, the emulsion will be difficult to form, but if the amount exceeds the aforementioned range, the water resistance of the ink will be degraded, and there is a tendency for the adhesion to be poor, neither of which are preferable.

The surfactant that is used herein is not particularly restricted, and preferable examples include anionic surfactants (such as sodium dodecylbenzensulfonate, sodiumlauryl sulfate, and an ammonium salt of polyoxyethylene alkyl ether sulfate, and the like), nonionic surfactants (such as polyoxyethylene alkyl ether, polyoxyethylene alkyl ester, polyoxyethylene sorbitan resin oxyester, polyoxyethylene alkyl phenyl ether, polyoxyethylene alkyl amine, polyoxyethylene alkyl amide, and the like), and a blend of two or more thereof can also be used.

Furthermore, the thermoplastic resin emulsion can be obtained by emulsion polymerization of the aforementioned resin component monomers in water containing a polymerization catalyst and an emulsifying agent. The polymerization initiator, emulsifying agent, and molecular weight adjusting agent that are used during the emulsion polymerization can be used in accordance with standard methods.

The polymerization initiator can be the same substance that is normally used for radical polymerization, and examples include potassium persulfate, ammonium persulfate, hydrogen peroxide, azobisisobutyronitrile, benzoyl peroxide, dibutyl peroxide, acetic peracid, cumene hydroperoxide, t-butyl hydroperoxide, paramenthane hydroperoxide, and the like. A water soluble polymerization initiator is preferable if the polymerization reaction is performed in water. Examples of the emulsifying agent include sodium lauryl sulfate, as well as other substances that are commonly used as anionic surfactants, nonionic surfactants, or amphoteric surfactants, and blends thereof may also be used. These can be a blend of 2 or more types.

The ratio of water and the resin of the dispersion phase component is preferably between 60 and 400 weight parts of water with 100 weight parts of resin, and a range between 100 and 200 weight parts of water is even more preferable.

If a resin emulsion is used as the thermoplastic resin, a commonly known resin emulsion can be used. For example, the resin emulsions shown in JP-B-62-1426, JP-A-3-56573, JP-A-3-79678, JP-A-3-160068, and JP-A-4-18462 can be used without modification. Furthermore, commercially available resin emulsions can also be used, and examples of these include Microgel E-1002 and E-5002 (styrene-acrylate resin emulsions; produced by Nippon Paint Co., Ltd.), Boncoat 4001 (acrylate resin emulsion; produced by Dainippon Ink and Chemicals, Inc.), Boncoat 5454 (styrene-acrylate resin emulsion; produced by Dainippon Ink and Chemicals, Inc.), SAE 1014 (styrene-acrylate resin emulsion; produced by Nippon Zeon Corp.), and Saivinol SK-200 (acrylic resin emulsion; produced by Saiden Chemical Industry Co. Ltd.), and the like.

The thermoplastic resin of the invention can be blended as a fine particle powder with the other components in the water-based ink composition, but preferably the fine resin particles are dispersed in an aqueous medium to form a resin emulsion prior to blending with the other components of the water-based ink composition.

The particle size of the fine resin particles of the invention is preferably in a range between 5 and 400 nm, more preferably in a range between 50 and 200 nm, from the viewpoint of long-term storage stability and ejection stability.

The water-based ink composition preferably contains between 0.1 and 15 wt % of thermoplastic resin, calculated based on solid content, and a range between 0.5 and 10 wt % is even more preferable. If the resin component in the water-based ink composition is too low, the ink film that forms on the surface of the plastic will be too thin, and adhesion to the plastic surface will be insufficient. On the other hand, if the amount of resin is too high, the resin dispersion will be unstable during storage of the ink composition, and the resin component may coagulate and solidify, or may not form a uniform film if even a small amount of water evaporates.

Preferably the amount of thermoplastic resin added is such that the weight ratio between the amount of alkanediol and the amount of thermoplastic resin (former:latter) is in a range between 4:3 and 5:2, from the viewpoint of adhesion to the plastic film.

Colorant

The water-based ink composition of the invention contains a colorant. This colorant can be either a pigment or a dye. However, the colorant of the invention is preferably a pigment.

The type of dye is not particularly restricted, and acidic dyes, direct dyes, reactive dyes, and basic dyes can be used.

If a pigment is used as the colorant, the water-based ink composition can contain any pigment that has conventionally been used in water-based ink compositions for inkjet recording. For example, the pigment can be either an organic pigment or an inorganic pigment that is conventionally used in ink compositions fort inkjet recording. The pigment can be added to the ink composition as a resin dispersed pigment that is dispersed in a dispersing agent such as a water soluble resin or a surfactant, or as a surface treated pigment that has been made dispersible or soluble in water-based solvent by introducing a hydrophilic group onto the pigment surface, without using a dispersing agent. Note, if the pigment is dispersed in a resin dispersing agent, the thermoplastic resins presented below can also be used as the dispersing agent. Furthermore, a blend of two or more pigments can also be used.

The inorganic pigment can be titanium oxide, iron oxide, or carbon black that has been produced by a commonly known method such as a contact method, furnace method, or thermal method or the like.

The organic pigment can be an azo pigment (such as azolake, insoluble azo pigment, condensed azo pigment, or chelated azo pigment), polycyclic pigment (such as phthalocyanine pigments, perlene pigments, perinone pigments, anthraquinone pigments, quinacridone pigments, dioxadine pigments, thioindigo pigments, isoindolinone pigments, and quinophthalone pigments), dye chelates (such as basic dye chelates, and acidic dye chelates), nitro pigments, nitroso pigments, and aniline black and the like. Of these pigments, those pigments which have good affinity towards water are preferably used.

Specific examples of pigments for black ink include carbon black pigments (C. I. Pigment Black 7) such as furnace black, lampblack, acetylene black, or channel black, copper oxide compounds, iron oxide compounds (C. I. Pigment Black 11), as well as metal oxides such as titanium oxide, and organic pigments such as aniline black (C. I. Pigment black 1).

Specific examples of preferable carbon black pigments include No. 2300, 900, MCF88, No. 20B, No. 33, No. 40, No. 45, No. 52, MA7, MA8, MA100, and No. 2200B produced by Mitsubishi Chemical Corp. Examples of carbon black pigments produced by Degussa include Carbon Black FW1, FW2, FW2V, FW18, FW200, S150, S160, S170, Pretex 35, U, V, 140U, and Special Black 6, 5, 4A, 4, and 250 and the like. Examples of carbon black pigments produced by Columbia Carbon include Conductex SC, Raven 1255, 5750, 5250, 5000, 3500, 1255, and 700 and the like. Examples of carbon black pigments produced by Cabot Corp. include Regal 400R, 330R, 660R, Mogul L, Monarch 700, 800, 880, 900, 1000, 1100, 1300, 1400, and Elftex 12 and the like.

Pigments which can be used for color inks include C. I. Pigment Yellow 1 (Fast Yellow G), 3, 12 (Disazo yellow AAA), 13, 14, 17, 23, 24, 34, 35, 37, 42 (yellow iron oxide), 53, 55, 74, 81, 83 (disazo yellow HR), 95, 97, 98, 100, 101, 104, 108, 109, 110, 117, 120, 138, 153, 154; C. I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 92, 101 (Bengara), 104, 105, 106, 108 (Cadmium Red), 112, 114, 122 (Quinacridone Magenta), 123, 146, 149, 166, 168, 170, 172, 177, 178, 179, 185, 190, 193, 209, 219; C. I. Pigment Violet 1 (Rhodamine Lake) 3, 5:1, 16, 19 (Quinacridone Red), 23, 38; and C. I. Pigment Blue 1, 2, 15 (Phthalocyanine Blue R), 15:1, 15:2, 15:3 (Phthalocyanine Blue G), 15:4, 15:6, (Phthalocyanine Blue E), 16, 17:1, 56, 60, 63; and the like.

The particle size of the pigment is not particularly restricted, but the average particle size is preferably no larger than 25 μm, and more preferably no larger than 1 μm. By using a pigment that has an average particle size of 25 μm or less, the occurrence of plugging can be suppressed, and better ejection stability can be achieved.

The amount of pigment added is preferably between 0.5 and 15 wt %, more preferably between 1.0 and 10.0 wt %, based on the total amount of ink composition.

Low Surface Tension Organic Solvent

The water-based ink composition can also include a low surface tension organic solvent if necessary. Examples of low surface tension organic solvents are monohydric alcohols and derivatives of polyvalent alcohols.

The monohydric alcohols are particularly monohydric alcohols with 1 to 4 carbon atoms, such as methanol, ethanol, n-propanol, i-propanol, and n-butanol and the like.

The polyvalent alcohol derivatives can be complete or partial ethers of low level alcohols having 1 to 4 carbon atoms with dihydric to pentahydric alcohols having 2 to 6 carbon atoms. The polyhydric alcohol derivatives herein are alcohol derivatives etherified on at least 1 hydroxyl group, and does not refer to simple polyhydric alcohols that do not contain an etherified hydroxyl group. The aforementioned ethers are preferably polyhydric alcohol low-level alkyl ethers expressed by the general formula (ii):

$$R^{21}O\text{---}[CH_2\text{---}CH(R^{23})\text{---}O]_t\text{-}R^{22} \quad (ii)$$

(wherein $R^{21}$ and $R^{22}$ are each independently a hydrogen atom or an alkyl group with 3 to 6 carbon atoms (preferably a butyl group), $R^{23}$ is a hydrogen atom or a low-level alkyl group with 1 to 4 carbon atoms, preferably a hydrogen atom, methyl group, or ethyl group, and t represents an integer between 1 and 8, preferably between 1 and 4, but at least one of either $R^{21}$ or $R^{22}$ is an alkyl group with 3 to 6 carbon atoms (preferably a butyl group).)

Specific examples of these polyhydric alcohol low-level alkyl ethers include mono-, di-, or tri-ethylene glycol mono- or di-alkyl ethers and mono-, di-, or tri-propylene glycol mono- or di-alkyl ethers, and preferable examples include triethylene glycol monobutyl ether, diethylene glycol monobutyl ether, diethylene glycol propyl ether, diethylene glycol monopentyl ether, and propylene glycol monobutyl ether and the like.

The low surface tension organic solvent is preferably diethylene glycol monobutyl ether or triethylene glycol monobutyl ether.

The amount of low surface tension organic solvent added is for example between 0 and 10.0 wt %, preferably between 2.0 and 8.0 wt %, based on the total amount of ink composition.

The various physical properties of the water-based ink composition can be appropriately controlled, but according to a preferable aspect of the invention, the viscosity of the water-based ink composition is preferably 25 mPa·s or less, and more preferably 10 mPa·s or less (25° C.). If the viscosity is within this range, the water-based ink composition can be stably ejected from an ink ejection head. Furthermore, the water-based ink composition can be appropriately controlled, and for example the surface tension is preferably in a range between approximately 20.0 and 40.0 mN/m (25° C.), and more preferably in a range between approximately 25.0 and 35.0 mN/m.

Wetting Agent

A wetting agent other than the aforementioned alkanediol and the pyrrolidone derivative can also be added to the water-based ink composition if necessary from the perspective of ease of handling during application and storage of the water-based ink composition. By adding a wetting agent, coagulation and hardening of the resin component due to evaporation of the water component can be prevented, and plugging of the nozzles in the inkjet head during inkjet application can be prevented, thus ensuring ejection stability.

Examples of the wetting agent are water-soluble polyhydric alcohols, and especially between dihydric and pentahydric alcohols with 2 to 10 carbon atoms; hydrocarbon solvents containing nitrogen such as formamides, imidazolidinones, and amines; and hydrocarbon solvents containing sulfur. Combinations of two or more thereof can also be used.

Example of the water-soluble polyhydric alcohol that can be used include any one or combinations of two or more divalent and trivalent alcohols with 3 to 10 carbon atoms, such as glycerin, ethylene glycol, diethylene glycol, triethylene glycol, dipropylene glycol, hexylene glycol, and 1,2,6-hexanetriol.

The amount of wetting agent added is between 0 and 20.0 wt %, preferably between 1.0 and 10.0 wt %, based on the total amount of water-based ink composition. By maintaining within this range, plugging can be prevented, and ejection stability can be ensured. If the amount added is too high, drying defects can also occur.

Main Solvent

As described above, water is used as the main solvent of the water-based ink composition. The water used herein can be purified water or ultra-purified water such as ion exchange water, ultra-filtration water, reverse osmosis water, or distilled water in order to strictly minimize ionic impurities. Furthermore, water that has been sterilized by ultraviolet light irradiation or by the addition of hydrogen peroxide is preferably used because mold and bacterial growth can be prevented during long-term storage of the ink composition.

Other Components

The water-based ink composition can achieve the desired effects by containing each of the aforementioned components, but if necessary, can also contain preservatives, anti-molding agents, pH adjusting agents, dissolving aids, antioxidants, and nozzle plug preventing agents and the like.

Examples of pH adjusting agents are potassium dihydrogen phosphate and disodium hydrogen phosphate, and the like. Examples of preservatives and anti-molding agents include sodium benzoate, sodium pentachlorophenol, sodium 2-pyridinethiol-1-oxide, sodium sorbate, sodium dehydroacetate, 1,2-dibenzothiazoline-3-one (Proxel CRL, Proxel BDN, Proxel GXL, Proxel XL-2, and Proxel TN produced by ICI Corp.) and the like. Examples of dissolving aids and antioxidants include diethanolamine, triethanolamine, propanolamine, morpholine, and other amines and variations thereof, potassium hydroxide, sodium hydroxide, lithium hydroxide, and other inorganic bases, ammonium hydroxide, quaternary ammonium hydroxide compounds (such as tetramethyl ammonium hydroxide and the like), potassium carbonate, sodium carbonate, lithium carbonate, and other carbonate and phosphate salts, as well as N-methyl-2-pyrrolidone, urea, thiourea, tetramethyl urea, and other ureas, allophanate, methyl allophanate, and other allophanates, biuret, dimethylbiuret, tetramethylbiuret, and other biurets, and L-ascorbic acid and salts thereof. Furthermore, urea, thiourea, or ethylene urea or the like can be added in order to prevent nozzle drying.

Manufacturing the Water-Based Ink Composition

The water-based ink that is used with the invention can be manufactured by appropriately blending in any order all of the aforementioned formulation components either individually or in the form of a pigment dispersion or resin emulsion, dissolving (or dispersing), and then filtering to remove impurities or the like if necessary.

According to one preferred aspect of the present invention, preferably the silicon-based surfactant of the water-based ink composition is a polysiloxane compound, the alkanediol is 1,2-hexanediol, and the pyrrolidone derivative is N-methylpyrrolidone. Using a water-based ink composition with this combination, printed matter with good image quality can be obtained by printing at a high duty of 50% or higher.

According to another aspect of the invention, recorded matter that has been printed using the inkjet recording method of the present invention can be obtained.

Working examples and test examples of the present invention are presented below in order to describe the present invention in more detail, but the invention is in no way restricted by these examples.

Manufacturing the Ink

Ink compositions were prepared using the compositions 1 through 4 shown below.

|  | Composition 1 | Composition 2 | Composition 3 | Composition 4 |
|---|---|---|---|---|
| Pigment | 4.0 | 4.0 | 4.0 | 4.0 |
| Pigment dispersing thermoplastic resin | 2.0 | 2.0 | 2.0 | 2.0 |
| Thermoplastic resin emulsion | 4.0 | 4.0 | 4.0 | 4.0 |
| Silicon-based surfactant | 0.1 | 1.5 | 0.5 | 0.05 |
| 1,2-hexanediol | 15.0 | 4.0 | 8.0 | 15.0 |
| N-methylpyrrolidone | 25.0 | 25.0 | 25.0 | 25.0 |
| Water | 49.9 | 59.5 | 56.5 | 50.0 |

(Formulation units are shown as "wt %".)

Note, the ink compositions of compositions 1 through 3 were used as Working Examples 1 through 3 using the recording method of the present invention by heating to a temperature of 40° C. or higher, and as Comparative Examples 2 through 4 using the recording method of the comparative example by heating to a temperature below 40° C., and the ink composition of composition 4 was used as Comparative Examples 1 and 5 using the recording method of the comparative examples.

For each composition, working examples of the invention were prepared using cyan, magenta, yellow, and black compositions (4 types) containing the following pigments.

C. I. Pigment Blue 15:3 (C: cyan ink composition)
C. I. Pigment Violet 19 (M: magenta ink composition)
C. I. Pigment Yellow 74 (Y: yellow ink composition)
C. I. Pigment Black 7 (K: black ink composition)

Furthermore, BYK-348 (brand-name, polyether modified organosiloxane manufactured by BYK Chemie Japan) was used as the silicon-based surfactant in each of the ink compositions.

Also, the details of the acrylic based dispersing resin and the acrylic based emulsion are shown below.

Pigment dispersing agent thermoplastic resin: styrene-acrylic acid copolymer (molecular weight 1000 to 10,000, acid value 100 to 300)

Thermoplastic resin emulsion: acrylic acid-acrylate ester copolymer (molecular weight 1000 to 10,000, glass transition temperature 10° C. to 100° C.)

Printing 1

Using an inkjet printer (PX-G900; manufactured by Seiko Epson Corp.) filled with four colors C, M, Y, and K of the ink compositions of compositions 1 through 5 prepared as described above, and using a cold laminate film PG-50L (PET media) manufactured by Lami Corporation Inc. as the recording medium having a recording surface which is a plastic film, the sheet feeder region was heated with a dryer to 70° C. so that the recording medium was 45° C., and then immediately printing a pattern where two of the colors are in contact at a resolution of 1440 dpi lateral 1440 dpi vertical at a duty between 40% and 100% as shown in Table 1 and 2.

Herein, the duty refers to what percentage of sections have ink dots from the total 2,073,600 sections created when a square inch is divided into 1440 sections laterally and 1440 sections vertically, for the case of lateral 1440 dpi, and vertical 1440 dpi.

Evaluation of Printed Matter

Bleeding and mottling was evaluated as shown below for each set of printed matter obtained. The results are shown in Table 1 and 2.

1. Bleeding: The occurrence of bleeding in the regions where the two colors contact in the printing pattern (no bleeding O, bleeding X) was evaluated by the following criteria at each level of duty.

Evaluation Criteria

AA: O up to duty of 70%, Printing without bleeding is possible up to this duty
A: O up to duty of 60%, Printing without bleeding is possible up to this duty
B: O up to duty of 50%, Printing without bleeding is possible up to this duty
C: O up to duty of 40%, Printing without bleeding is possible up to this duty
D: X at duty of 40% or higher, bleeding occurs when printing at 40% duty 2. Mottling: The occurrence of color intensity variation (No variation 0, variation X) in the solid single color sections was evaluated by the following criteria at each level of duty.

Evaluation Criteria

A: O up to duty of 70%, Printing without mottling variation is possible up to this duty
B: O up to duty of 60%, Printing without mottling variation is possible up to this duty
C: O up to duty of 50%, Printing without mottling variation is possible up to this duty
D: X at duty of 50% or higher, mottling variation occurs when printing at 50% duty

TABLE 1

1. Bleeding Evaluation
(1) Media temperature during printing 45° C.

|  |  | 1,2-hexanediol | Silicon-based surfactant | Printing duty | | | | | | | Evaluation |
|---|---|---|---|---|---|---|---|---|---|---|---|
|  |  |  |  | 40% | 50% | 60% | 70% | 80% | 90% | 100% |  |
| Working Example 1 | Composition 1 | 15% | 0.1% | O | O | O | O | X | X | X | AA |
| Working example 2 | Composition 2 | 4% | 1.5% | O | O | X | X | X | X | X | B |

TABLE 1-continued

1. Bleeding Evaluation
(1) Media temperature during printing 45° C.

| | | 1,2-hexanediol | Silicon-based surfactant | Printing duty | | | | | | | Evaluation |
|---|---|---|---|---|---|---|---|---|---|---|---|
| | | | | 40% | 50% | 60% | 70% | 80% | 90% | 100% | |
| Working example 3 | Composition 3 | 8% | 0.5% | ○ | ○ | ○ | X | X | X | X | A |
| Comparative example 1 | Composition 4 | 15% | 0.05% | ○ | X | X | X | X | X | X | C |

TABLE 2

2. Mottling Evaluation
(1) Media temperature during printing 45° C.

| | | 1,2-hexanediol | Silicon-based surfactant | Printing duty | | | | | | | Evaluation |
|---|---|---|---|---|---|---|---|---|---|---|---|
| | | | | 40% | 50% | 60% | 70% | 80% | 90% | 100% | |
| Working Example 1 | Composition 1 | 15% | 0.1% | ○ | ○ | ○ | ○ | ○ | X | X | A |
| Working example 2 | Composition 2 | 4% | 1.5% | ○ | ○ | ○ | X | X | X | X | B |
| Working example 3 | Composition 3 | 8% | 0.5% | ○ | ○ | ○ | ○ | ○ | ○ | ○ | A |
| Comparative example 1 | Composition 4 | 15% | 0.05% | ○ | X | X | X | X | X | X | D |

Printing 2 and Evaluation of Printed Matter

A pattern where two colors are in contact was printed at a resolution of 1440 dpi lateral, 1440 dpi vertical at each duty between 40% and 100% as shown in Table 3 and 4 using the same method as Printing 1 except that the recording medium that was set in the sheet feeder was heated with a dryer to 60° C., so that the recording medium during printing was at 35° C. Furthermore, the same evaluations as Printing 1 were performed for each set of printed matter obtained. The results are shown in Table 3 and 4.

TABLE 3

1. Bleeding Evaluation
(2) Media temperature during printing 35° C.

| | | 1,2-hexanediol | Silicon-based surfactant | Printing duty | | | | | | | Evaluation |
|---|---|---|---|---|---|---|---|---|---|---|---|
| | | | | 40% | 50% | 60% | 70% | 80% | 90% | 100% | |
| Comparative example 2 | Composition 1 | 15% | 0.1% | ○ | X | X | X | X | X | X | C |
| Comparative example 3 | Composition 2 | 4% | 1.5% | ○ | X | X | X | X | X | X | C |
| Comparative example 4 | Composition 3 | 8% | 0.5% | ○ | X | X | X | X | X | X | C |
| Comparative example 5 | Composition 4 | 15% | 0.05% | X | X | X | X | X | X | X | D |

TABLE 4

2. Mottling Evaluation
(2) Media temperature during printing 35° C.

| | | 1,2-hexanediol | Silicon-based surfactant | Printing duty | | | | | | | Evaluation |
|---|---|---|---|---|---|---|---|---|---|---|---|
| | | | | 40% | 50% | 60% | 70% | 80% | 90% | 100% | |
| Comparative example 2 | Composition 1 | 15% | 0.1% | ○ | ○ | ○ | ○ | ○ | X | X | A |
| Comparative example 3 | Composition 2 | 4% | 1.5% | ○ | ○ | ○ | X | X | X | X | B |
| Comparative example 4 | Composition 3 | 8% | 0.5% | ○ | ○ | ○ | ○ | ○ | ○ | ○ | A |
| Comparative example 5 | Composition 4 | 15% | 0.05% | ○ | X | X | X | X | X | X | D |

The present invention has the possibility of industrial use as an inkjet recording method with improved ink mottling and color bleeding using a water-based ink on a recording medium having a recording surface which is a plastic film, when printing particularly at a high duty of 50% or more, and also as recorded matter with good image quality and excellence abrasion resistance that was printed using this recording method.

What is claimed is:

1. An inkjet recording method for printing by ejecting droplets of a water-based ink composition onto a recording medium, the method comprising:
providing a water-based ink composition consisting of colorant, a silicon-based surfactant of formula (I), 1,2-hexanediol, pyrrolidone derivative, thermoplastic resin, a pigment dispersing agent, a wetting agent, water and optionally a low surface tension organic solvent selected from a monohydric alcohol or a polyvalent alcohol derivative, the weight ratio of the silicon-based surfactant and the 1,2-hexanediol being 1:150 to 3:8, the wetting agent being at least one selected from the group consisting of glycerin, ethylene glycol, diethylene glycol, triethylene glycol, dipropylene glycol, hexylene glycol and 1,2,6-hexanetriol, the weight of the wetting agent in the water-based ink composition being more than 0% and less than 10%, the pigment dispersing agent having a molecular weight of 1,000 to 10,000 and an acid value of 100 to 300, and the thermoplastic resin having a molecular weight of 1,000 to 10,000 and a glass transition temperature of 10° C. to 100° C.;
heating the water-based ink composition that has adhered to a recording surface of the recording medium to a temperature of 40° C. or higher; and
printing an image on the recording surface with the water-based ink composition with a duty at 50% or higher,

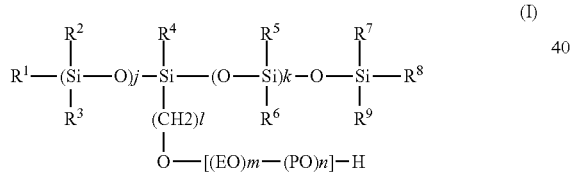

(I)

wherein $R^1$ to $R^9$ independently represent a C1-6 alkyl group, j and k independently represent an integer of 1 or more, EO represents an ethyleneoxy group, PO represents a propyleneoxy group, m and n represent an integer of 0 or more, where m+n represents an integer of 1 or more, and EO and PO in the bracket [ ] may occur in any order, either randomly or as a block.

2. The inkjet recording method according to claim 1, wherein the water-based ink composition contains the low surface tension organic solvent, and the low surface tension organic solvent is diethylene glycol monobutyl ether or triethylene glycol monobutyl ether.

3. The inkjet recording method according to claim 1, wherein the pigment dispersing agent is styrene-acrylic acid copolymer and the thermoplastic resin is acrylic acid-acrylate ester copolymer.

4. An inkjet recording method for printing an image by ejecting droplets of a water-based ink composition onto a recording medium, the method comprising:
providing a water-based ink composition consisting of colorant, a silicon-based surfactant of formula (I), 1,2-hexanediol, pyrrolidone derivative, thermoplastic resin, a pigment dispersing agent, a wetting agent, water and optionally a low surface tension organic solvent selected from a monohydric alcohol or a polyvalent alcohol derivative, the weight ratio of the silicon-based surfactant and the 1,2-hexanediol being 1:150 to 3:8;
heating the water-based ink composition that has adhered to a recording surface of the recording medium to a temperature of 40° C. or higher; and
printing an image on the recording surface with the water-based ink composition with a duty at 50% or higher,

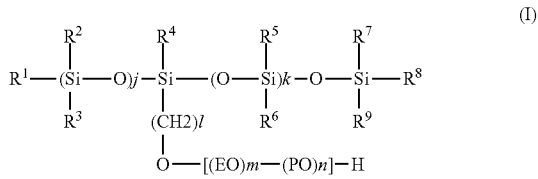

(I)

wherein $R^1$ to $R^9$ independently represent a C1-6 alkyl group, j and k independently represent an integer of 1 or more, EO represents an ethyleneoxy group, PO represents a propyleneoxy group, m and n represent an integer of 0 or more, where m+n represents an integer of 1 or more, and EO and PO in the bracket [ ] may occur in any order, either randomly or as a block.

5. The inkjet recording method according to claim 4, wherein the water-based ink composition contains the low surface tension organic solvent, and the low surface tension organic solvent is diethylene glycol monobutyl ether or triethylene glycol monobutyl ether.

6. The inkjet recording method according to claim 4, wherein the wetting agent is at least one selected from the group consisting of glycerin, ethylene glycol, diethylene glycol, triethylene glycol, dipropylene glycol, hexylene glycol and 1,2,6-hexanetriol.

* * * * *